(12) United States Patent
Batmaz et al.

(10) Patent No.: US 11,934,520 B2
(45) Date of Patent: Mar. 19, 2024

(54) DETECTING DATA ANOMALIES ON A DATA INTERFACE USING MACHINE LEARNING

(71) Applicant: Nvidia Corporation, Santa Clara, CA (US)

(72) Inventors: Gorkem Batmaz, Santa Clara, CA (US); Nicola DiMiscio, Santa Clara, CA (US); Mark Overby, Snohomish, WA (US); Ildiko Pete, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1083 days.

(21) Appl. No.: 16/368,589

(22) Filed: Mar. 28, 2019

(65) Prior Publication Data

US 2019/0303567 A1 Oct. 3, 2019

Related U.S. Application Data

(60) Provisional application No. 62/649,531, filed on Mar. 28, 2018.

(51) Int. Cl.
*G06N 3/08* (2023.01)
*G06F 11/30* (2006.01)
(Continued)

(52) U.S. Cl.
CPC ........ *G06F 21/552* (2013.01); *G06F 11/3027* (2013.01); *G06F 11/349* (2013.01);
(Continued)

(58) Field of Classification Search
CPC ............... H04L 12/40; H04L 12/40045; H04L 63/1416; H04L 63/1441; H04L 67/12;
(Continued)

(56) References Cited

U.S. PATENT DOCUMENTS 5,046,019 A * 9/1991 Basehore ............... G06N 3/043
706/900
6,246,782 B1 * 6/2001 Shapiro ................. G06T 7/0012
382/128
(Continued)

OTHER PUBLICATIONS

Taylor et al., Anomaly Detection in Automobile Control Network Data with Long Short-Term Memory Networks, 2016, IEEE, pp. 130-138. (Year: 2016).*

(Continued)

*Primary Examiner* — Lynn D Feild
*Assistant Examiner* — Abdullah Almamun (57) ABSTRACT

The disclosure provides systems and processes for applying neural networks to detect intrusions and other anomalies in communications exchanged over a data bus between two or more devices in a network. The intrusions may be detected in data being communicated to an embedded system deployed in vehicular or robotic platforms. The disclosed system and process are well suited for incorporation into autonomous control or advanced driver assistance system (ADAS) vehicles including, without limitation, automobiles, motorcycles, boats, planes, and manned and un-manned robotic devices. Data communicated to an embedded system can be detected over any of a variety of data buses. In particular, embodiments disclosed herein are well suited for use in any data communication interface exhibiting the characteristics of a lack of authentication or following a broadcast routing scheme—including, without limitation, a control area network (CAN) bus.

20 Claims, 7 Drawing Sheets

(51) Int. Cl.
G06F 11/34 (2006.01)
G06F 21/55 (2013.01)
G06F 21/85 (2013.01)
G06N 3/044 (2023.01)
G06N 3/045 (2023.01)
G06N 3/088 (2023.01)
G06N 5/045 (2023.01)
G06N 7/01 (2023.01)
H04L 9/40 (2022.01)
H04L 12/40 (2006.01)
H04L 67/12 (2022.01)

(52) U.S. Cl.
CPC .......... G06F 21/554 (2013.01); G06F 21/556 (2013.01); G06F 21/85 (2013.01); G06N 3/044 (2023.01); G06N 3/045 (2023.01); G06N 3/08 (2013.01); G06N 3/088 (2013.01); G06N 5/045 (2013.01); G06N 7/01 (2023.01); H04L 12/40 (2013.01); H04L 12/40045 (2013.01); H04L 63/1416 (2013.01); H04L 63/1441 (2013.01); G06F 2221/034 (2013.01); H04L 67/12 (2013.01)

(58) Field of Classification Search
CPC ............... G06F 11/3027; G06F 11/349; G06F 2221/034; G06N 3/0445; G06N 3/08; G06N 3/088; G06N 3/045
See application file for complete search history.

(56) References Cited

U.S. PATENT DOCUMENTS

| | | | |
|---|---|---|---|
| 8,989,954 B1* | 3/2015 | Addepalli | G06F 3/017 701/32.7 |
| 10,322,728 B1* | 6/2019 | Porikli | G06K 9/6274 |
| 10,389,744 B2* | 8/2019 | Hartkopp | H04L 63/1408 |
| 10,601,852 B2* | 3/2020 | Takahashi | H04L 41/142 |
| 10,699,195 B2* | 6/2020 | Lehman | G06N 3/0445 |
| 11,611,588 B2* | 3/2023 | Vasu | H04L 63/1416 |
| 2004/0054505 A1 | 3/2004 | Lee | |
| 2014/0344203 A1* | 11/2014 | Ahn | G06N 3/084 706/25 |
| 2017/0060844 A1* | 3/2017 | He | G06F 16/3331 |
| 2018/0053108 A1* | 2/2018 | Olabiyi | G06N 7/005 |
| 2018/0268015 A1* | 9/2018 | Sugaberry | G06Q 10/067 |
| 2019/0325134 A1* | 10/2019 | Gronát | G06N 3/084 |
| 2019/0385057 A1* | 12/2019 | Litichever | H04L 63/14 |
| 2020/0066062 A1* | 2/2020 | Weber | G07C 5/008 |

OTHER PUBLICATIONS

Studnia, et al.; "Survey on security threats and protection mechanisms in embedded automotive networks"; HAL archives-ouverts.fr; HAL Id: HAL-01176042; https://hal.archives-ouvertes.fr/hal-01176042; Jul. 14, 2015; 13 pgs.

Jafarnejad, et al.; "A Car Hacking Experiment: When Connectivity Meets Vulnerability"; ResearchGate; https://www.researchgate.net/publication/286931560; Dec. 2015; 7 pgs.

Checkoway, et al.; "Comprehensive Experimental Analyses of Automotive Attack Surfaces"; http://www.autosec.org/pubs/cars-usenixsec2011.pdf; 2011; 16 pgs.

"Automotive CAN Bus System Explained"; mbedlabs Technosolutions; http://www.mbedlabs.com/2016/01/automotive-can-bus-system-explained.html; Jan. 20, 2016; 7 pgs.

Miller, et al.; "Adventures in Automotive Networks and Control Units"; http://illmatics.com/car_hacking.pdf, 101 pgs.

Chandola, et al.; "Anomaly Detection: A Survey"; University of Minnesota; ACM Computing Surveys; Sep. 2009; 72 pgs.

Bhattacharyya, et al.; "Netowrk Anomaly Detection: A Machine Learning Perspective"; ResearchGate; https://www.researchgate.net/publication/307936101; Apr. 2013; 367 pgs.

"Programmable Vision Accelerator", U.S. Appl. No. 62/156,167, filed May 1, 2015.

"Programmable Vision Accelerator", U.S. Appl. No. 15/141,703, filed Apr. 28, 2016.

"Reliability Enhancement Systems and Methods" U.S. Appl. No. 15/338,247, filed Oct. 28, 2016.

"Methodology of Using a Single Controller (ECU) For a Fault-Tolerant/Fail-Operational Self-Driving System", U.S. Appl. No. 62/524,283, filed Jun. 23, 2017.

"Systems and Methods for Safe and Reliable Autonomous Vehicles" U.S. Appl. No. 62/584,549, filed Nov. 10, 2017.

"System and Method for Controlling Autonomous Vehicles", U.S. Appl. No. 62/614,466, filed Jan. 7, 2018.

"System and Method for Safe Operation of Autonomous Vehicles", U.S. Appl. No. 62/625,351, filed Feb. 2, 2018.

"Conservative Control for Zone Driving of Autonomous Vehicles Using Safe Time of Arrival", U.S. Appl. No. 62/628,831, filed Feb. 9, 2018.

"System and Method for Sharing Camera Data Between Primary and Backup Controllers in Autonomous Vehicle Systems", U.S. Appl. No. 62/629,822, filed Feb. 13, 2018.

"Pruning Convolutional Neural Networks for Autonomous Vehicles and Robotics", U.S. Appl. No. 62/630,445, filed Feb. 14, 2018.

"Methods for accurate real-time object detection and for determining confidence of object detection suitable for autonomous vehicles" U.S. Appl. No. 62/631,781, filed Feb. 18, 2018.

"System and Method for Autonomous Shuttles, Robo-Taxis, Ride-Sharing and On-Demand Vehicles", U.S. Appl. No. 62/635,503, filed Feb. 26, 2018.

"Convolutional Neural Networks to Detect Drivable Freespace for Autonomous Vehicles" U.S. Appl. No. 62/643,665, filed Mar. 15, 2018.

"Deep Neural Network for Estimating Depth from Stereo Using Semi-Supervised Learning", U.S. Appl. No. 62/646,148, filed Mar. 21, 2018.

"Video Prediction Using Spatially Displaced Convolution", U.S. Appl. No. 62/646,309, filed Mar. 21, 2018.

"Video Prediction Using Spatially Displaced Convolution", U.S. Appl. No. 62/647,545, filed Mar. 23, 2018.

"Geometric Shadow Filter for Denoising Ray-Traced Shadows", U.S. Appl. No. 62/644,385, filed Mar. 17, 2018.

"Energy Based Reflection Filter for Denoising Ray-Traced Glossy Reflections", U.S. Appl. No. 62/644,386, filed Mar. 17, 2018.

"Distance Based Ambient Occlusion Filter for Denoising Ambient Occlusions", U.S. Appl. No. 62/644,601, filed Mar. 19, 2018.

"Adaptive Occlusion Sampling of Rectangular Area Lights with Voxel Cone Tracing" U.S. Appl. No. 62/644,806, filed Mar. 19, 2018.

"System and Methods for Advanced AI-Assisted Vehicles", U.S. Appl. No. 62/648,358, filed Mar. 26, 2018.

"System and Method for Training, Testing, Verifying, and Validating Autonomous and Semi-Autonomous Vehicles", U.S. Appl. No. 62/648,399, filed Mar. 27, 2018.

"Method and System of Remote Operation of a Vehicle Using an Immersive Virtual Reality Environment", U.S. Appl. No. 62/648,493, filed Mar. 27, 2018.

Taylor, et al.; "Anomaly Detection in Automobile Control Network Data with Long Short-Term Memory Networks"; 2016 IEEE International Conference on Data Science and Advanced Analytics; IEEE Xplore; 10 pgs.

* cited by examiner

| Timestamp | MessageID | Length | BYTE 0 | BYTE 1 | BYTE 2 | BYTE 3 | BYTE 4 | BYTE 5 | BYTE 6 | BYTE 7 | DATA TYPE |
|---|---|---|---|---|---|---|---|---|---|---|---|
| 5741657913023335 | 101 | 8 | 143 | 4 | 140 | 4 | 160 | 4 | 155 | 4 | W-Speed |
| 5741657913023421 | 102 | 8 | 3 | 254 | 55 | 254 | 15 | 254 | 15 | 254 | SUSPENSION |
| 5741657913023432 | 103 | 4 | 1 | 0 | 252 | 255 | 0 | 0 | 0 | 0 | ROLL&YAW |
| 5741657913023441 | 104 | 6 | 223 | 255 | 247 | 255 | 223 | 3 | 0 | 0 | ACCELERATION |

THIS IS THE PART OF THE MESSAGE SELECTED BY THE CONTENT EXTRACTOR FOR PROCESSING TO DETERMINE ANOMALIES

EXAMPLES OF DIFFERENT DATA TYPES SELECTED BY THE CONTENT EXTRACTOR FOR PROCESSING

DETECTING DATA ANOMALIES ON A DATA INTERFACE USING MACHINE LEARNING

CROSS-REFERENCE TO RELATED APPLICATION

This Application claims the benefit of U.S. Provisional Application Ser. No. 62/649,531 filed by Gorkem Batmaz, et al. on Mar. 28, 2018, entitled "TWO-STAGE ANOMALY DETECTION FOR THE CAN BUS", commonly assigned with this application and incorporated herein by reference in its entirety.

TECHNICAL FILED

This application is directed, in general, to secure data communication and, more specifically, to detecting anomalies in data communicated over data interfaces.

BACKGROUND

Different types of networks are used to connect and communicate data between devices. Communicating data securely over the networks is a priority regardless the network type. Protecting data communications in a reasonable timeframe, however, can be difficult in some applications. The type of data interfaces that are used to connect the devices can also present challenges to secure data communications. For example, data interfaces that follow a broadcast routing scheme and are used in real-time applications can be difficult to protect. Data interfaces that are vulnerable to attacks can not only be troublesome but can also be deadly considering the type of system in which the data interfaces are employed, such as in a system controlling the operation of a vehicle.

A Controller Area Network (CAN) bus is a common data interface that is used in vehicles. CAN is an example of a communication network that lacks authentication and follows a broadcast routing scheme. As such, devices connected to a CAN bus can be exposed to a broad range of cyber-attacks. Though attempts have been made to detect malicious behavior, attack detection should be achieved within a reasonable timeframe (a few, if not a single, CAN transmission frames) considering the resource limitations in a vehicle environment to allow actions to be taken. Existing work in anomaly detection has not been proved to detect anomalies in real time to support real time security actions.

SUMMARY

In one aspect, a method for detecting anomalous data communicated over a data interface is disclosed. In one embodiment, the method includes: (1) applying a first data package of a first data type received from a data interface as input to a first neural network, (2) generating, by the first neural network and based on the first data package, predicted data values for a subsequent data package of the first data type received from the data interface, (3) receiving a subsequent data package of the first data type comprising real data values, (4) determining a first deviation value for the first data type by comparing the real data values with the predicted data values, (5) applying the first deviation value with one or more other deviation values corresponding to one or more other data types as input to a second neural network, and (6) calculating, by the second neural network, a probability of an attack on the data interface based on the first deviation value and the one or more other deviation values.

In another aspect, the disclosure provides an electronic system. In one embodiment, the electronic system includes: (1) a broadcast bus, (2) peripheral devices coupled to the broadcast bus, and (3) a computer coupled to the broadcast bus and including an anomaly detector. The anomaly detector having: (3A) a contextual detector configured to determine contextual anomalies for different data types communicated over the broadcast bus from the peripheral devices employing parallel neural networks, wherein each of the contextual anomalies are based on a deviation value representing a probability of an anomaly in the different data types and each one of the parallel neural networks is for one of the different data types, and (3B) a collective detector configured to determine which of the contextual anomalies are out of context by employing a second neural network to compare each of the deviation values with one or more of the deviation values, and to generate a probability of an attack on the data interface based on the contextual anomalies that are out of context In yet another aspect, a method of detecting anomalies of data communicated via a data interface is disclosed. In one embodiment, the method includes: (1) determining contextual anomalies for different data types communicated over a data interface by generating deviation values for the different data types employing a first neural network, (2) determining which of the contextual anomalies are out of context by comparing each of the deviation values to one or more of the other deviation values employing a second neural network, and (3) generating a probability of attack based on the contextual anomalies that are out of context, wherein the probability of attack indicates a probability of an error in subsequent communications of the different types of data associated with the contextual anomalies that are out of context.

BRIEF DESCRIPTION

Reference is now made to the following descriptions taken in conjunction with the accompanying drawings, in which.

DETAILED DESCRIPTION

The connectivity of a vehicle to the outside world results in significant security concerns; especially as vehicles are increasingly controlled by computers. CAN buses, due to their characteristics, provide a vulnerable target for attacking vehicles. A CAN bus carries actuation signals in vehicles, and in the case of a self-driving car the severity of risks associated to hacking the CAN bus escalates dramatically. Hacking the CAN bus of an autonomous vehicle may result in the hacker taking full remote control of the vehicle. Detecting anomalies in CAN data provides a protection mechanism against some vulnerabilities associated with CAN buses.

The disclosure provides a machine learning solution to identify deviations from normal network traffic to enhance the security of data interfaces, such as a CAN bus. A multistage anomaly detector and detection method are provided that employ multiple neural networks to detect anomalies in data packages communicated on the data interface. The neural networks can be Recurrent Neural Networks (RNNs). In some examples disclosed herein the RNNs are implemented as cascaded Long Short-Term Memory (LSTM) networks. LSTM networks are a type of RNNs that have been successfully applied in sequence prediction problems.

The machine learning solution is configured to detect different types of anomalies including both contextual anomalies and collective anomalies. A contextual anomaly is a real data value of a single data type that deviates from predicted data values. In one or more embodiments, the predicted data values can be from a range or set of values that a neural network has learned (e.g., been trained) to expect, or otherwise considers to be within the limits of values from a training data set during normal (e.g., secure) operation. A contextual anomaly, for example, is a conditional anomaly such as when a vehicle speed changes from 50 miles per hour to 80 miles/hour in a relatively short amount of time that would be inconsistent with safe and/or normal driving behaviour. A collective anomaly is a contextual anomaly that is verified in view of deviation values from other data types. A collective anomaly occurs, for example, when the vehicle speed is 80 miles per hour and the steering wheel angle is at 90 degrees.

An anomaly detector can include a first stage contextual detector and a second stage collective detector. The contextual detector generates deviation values for monitored data types that are used to indicate contextual anomalies. The data types to monitor can be fetched by the contextual detector. In some examples disclosed herein the contextual detector includes a content extractor that is configured to fetch the data types to monitor. Data types having a continuous waveform are often selected for monitoring. The collective detector determines collective anomalies from the deviation values by comparing the deviation values (e.g., all the deviation values), including the ones indicating contextual anomalies, to determine if a contextual anomaly is a malicious anomaly or a genuine anomaly representing an actual operating condition. The collective detector provides a level of correlation between the different data types and provides a sanity check for the contextual anomalies. As such, false alarms can be prevented.

The anomaly detection can advantageously occur in real time. Considering for example CAN messages, real time means anomaly detection is decided within a single CAN protocol frame upon arrival of each CAN message. Accordingly, the disclosed anomaly detection can be used in systems requiring rapid responses. One such system is a control system for operating a vehicle. Thus, the anomaly detection can be employed as one of multiple intrusion detection methods in a broader embedded security system deployed in automotive platforms. The embedded system can be a car computer, i.e., an embedded system deployed in modern vehicles, that is connected to vulnerable end-points via a data interface. Typical examples of a car computer include infotainment systems, advanced driver assistance system (ADAS) units, dashboards, and head units. The vulnerable end-points are peripheral devices connected to the computer via the data interface, such as, sensors, cameras, media devices, local and wide area communication interfaces and devices (e.g., wireless fidelity (Wi-Fi), Bluetooth (BT), and cellular devices), specific car network interfaces and other devices (e.g., CAN, Local Interconnect Network (LIN), FlexRay, and Ethernet Audio Video Bridging (eAVB) devices). Vehicles as used herein include automobiles, trucks, motorcycles, boats, submarines, trains, airplanes, drones, helicopters, space craft, satellites, rockets, missiles, and other vehicles that can travel and carry something. The vehicle can travel on a street, road, highway, air, space, orbit, on top of water, under water, and in other environments.

The embedded security system can employ virtualization based on a virtual machine monitor, such as a hypervisor, and a number of virtualization services to host virtual machines for end user applications, typically called guest operating systems (Guest OSes). The security system leverages virtualization to implement a Virtual Intrusion Detection and Prevention system (VIDPS) to detect and counterfight attacks against the virtualized embedded system. The disclosed anomaly detection can be one of the methods employed for intrusion detection on the data interface of the vehicle that is routed to the embedded security system.

Figure 1:
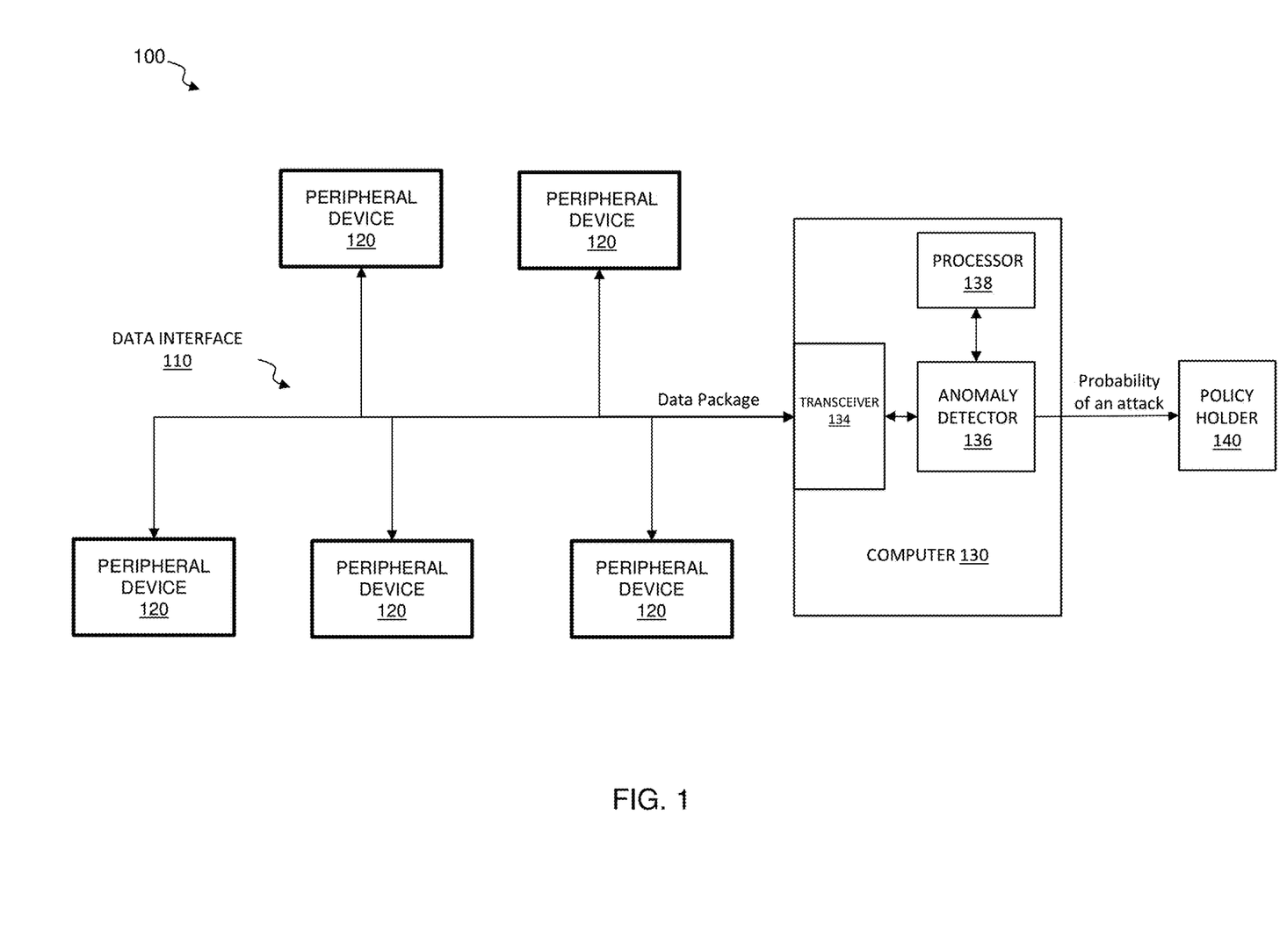
FIG. 1 illustrates a block diagram of an example of a communication system constructed according to the principles of the disclosure that includes multiple peripheral devices coupled together via a data interface.

FIG. 1 illustrates a block diagram of an example of a communication system 100 constructed according to the principles of the disclosure. The communication system 100 can be located within a vehicle and can be connected to an embedded security system deployed in automotive platforms. The communication system 100 can also be employed with other machines or systems, such as heating, ventilation, and air conditioning (HVAC) systems, home security systems, or a system including a plurality of Internet of things (IoT) devices.

The communication system 100 includes multiple peripheral devices coupled together via a data interface 110. The data interface 110 is a communication interface that connects and allows communication between the peripheral devices. The data interface 110 can be a serial communication bus that communicates data packages via a message-based protocol without employing a host computer. In one example, the data interface 110 is a broadcast bus, such as a CAN bus.

Each of the peripheral devices is denoted as a peripheral device 120 in FIG. 1 and will be referred to collectively as peripheral devices 120. The peripheral devices 120 transmit and receive, i.e., communicate, data packages via the data interface 110. The peripheral devices 120 can generate, sense, or process the data packages that are communicated over the data interface 110. The peripheral devices 120 can be sensors, electronic control units, (ECUs), input/output (I/O) devices, etc. Each of the peripheral devices 120 can be a different type of device or some of the peripheral devices 120 can be the same type of device. In some examples, the peripheral devices 120 can be endpoints or nodes of a broadcast bus, such as a CAN bus. Each of the peripheral devices 120 can communicate data packages with a computer 130 communicatively coupled to the data interface 110.

The computer 130 includes a transceiver 134, an anomaly detector 136, and a processor 138. The transceiver 134 is configured to communicate data packages and filter data packages received via the data interface 110. The transceiver 134 can include a firewall that is configured to filter the data packages based on, for example, a message ID.

The anomaly detector 136 is configured to detect anomalies in data packages employing machine learning. The anomaly detector 136 detects both contextual anomalies and collective anomalies in the data packages. The anomaly detector 136 can include multiple neural network stages to first determine contextual anomalies for different data types received via the data interface 110 and then determine collective anomalies from the contextual anomalies. The anomaly detector 136 can be configured as the anomaly detector 200 of FIG. 2.

The anomaly detector 136 provides an output based on the collective anomalies that indicates a probability of attack for the different data types received via the data interface 110. The probability of attack can be sent to a policy holder 140 for the communications system 100 that can determine how to respond to protect the communications system 100. The policy holder 140 can be a processor configured to perform an action in response to the probability of attack. For example, the policy holder 140 can disregard data packages received from a particular peripheral device 120 or prevent data packages from being sent over the data interface 110 from a particular peripheral device 120.

The processor 138 is configured to control the operation of a system or subsystem associated with the communication system 100. The processor 138, for example, can include the necessary logic to operate as an ECU. The processor 138 can receive data packages via the data interface 110 and can also generate data packages to be transmitted via the data interface 110. The anomaly detector 136 can provide bi-directional protection of both the received and transmitted data packages. Thus, the anomaly detector 136 can protect the data interface 110 from a compromised source of data packages, such as the processor 138, and also protect the processor 138 from receiving data packages from a peripheral device 120 on the data interface 110 that is compromised.

Figure 2:
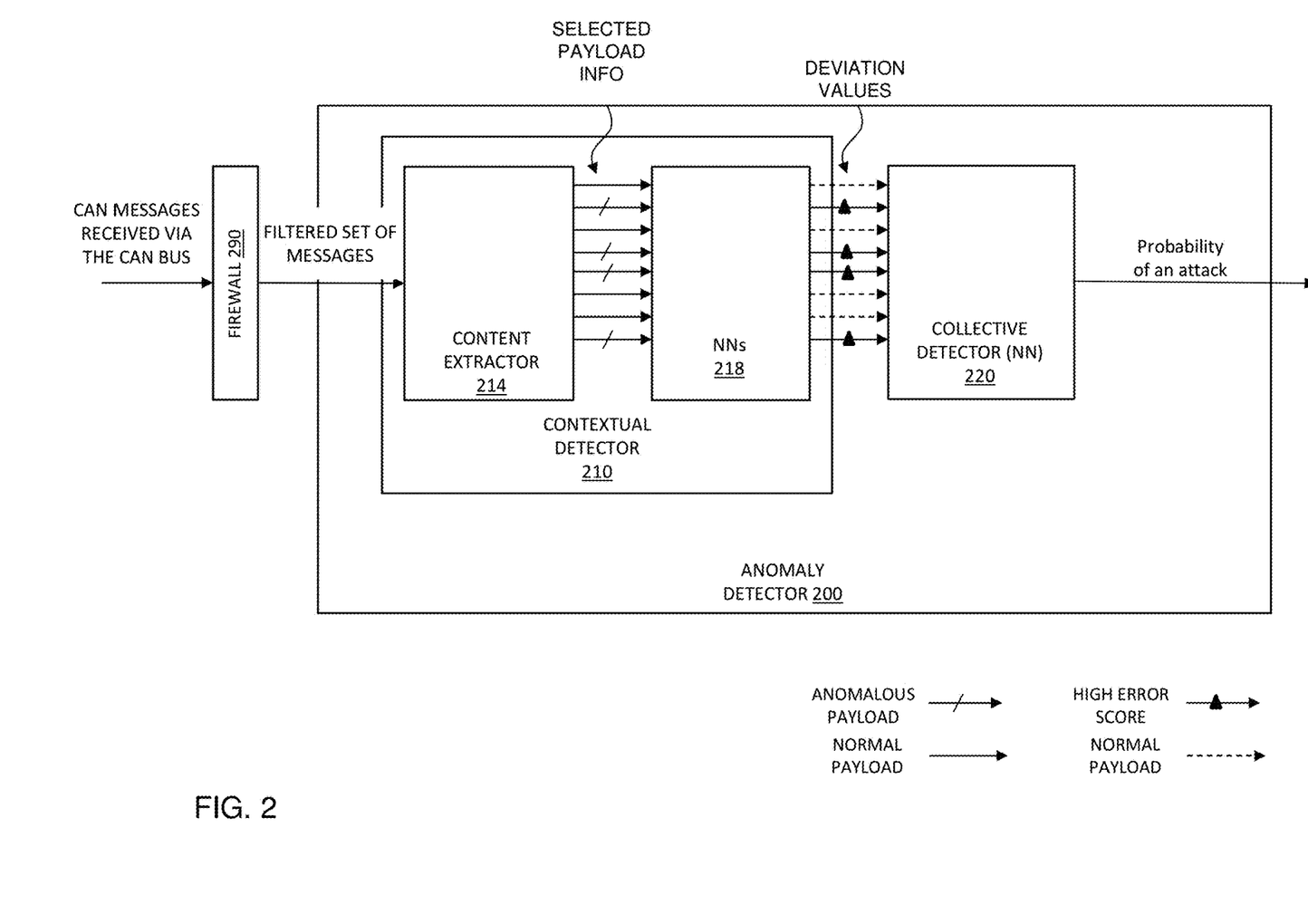
FIG. 2 illustrates a block diagram of an example of an anomaly detector constructed according to the principles of the disclosure.

FIG. 2 illustrates a block diagram of an example of an anomaly detector 200 constructed according to the principles of the disclosure. The anomaly detector 200 provides a machine learning solution that detects both contextual anomalies and collective anomalies in data packages communicated over a data interface. For FIG. 2, the anomaly detector 200 is employed with a data interface that is a CAN bus. Accordingly, data packages received by the anomaly detector 200 are CAN frames or messages. The messages can be provided in the form of raw CAN data (e.g., a 64-bit payload associated with message identifiers). An example of a CAN message is illustrated in FIG. 3.

Figure 3:
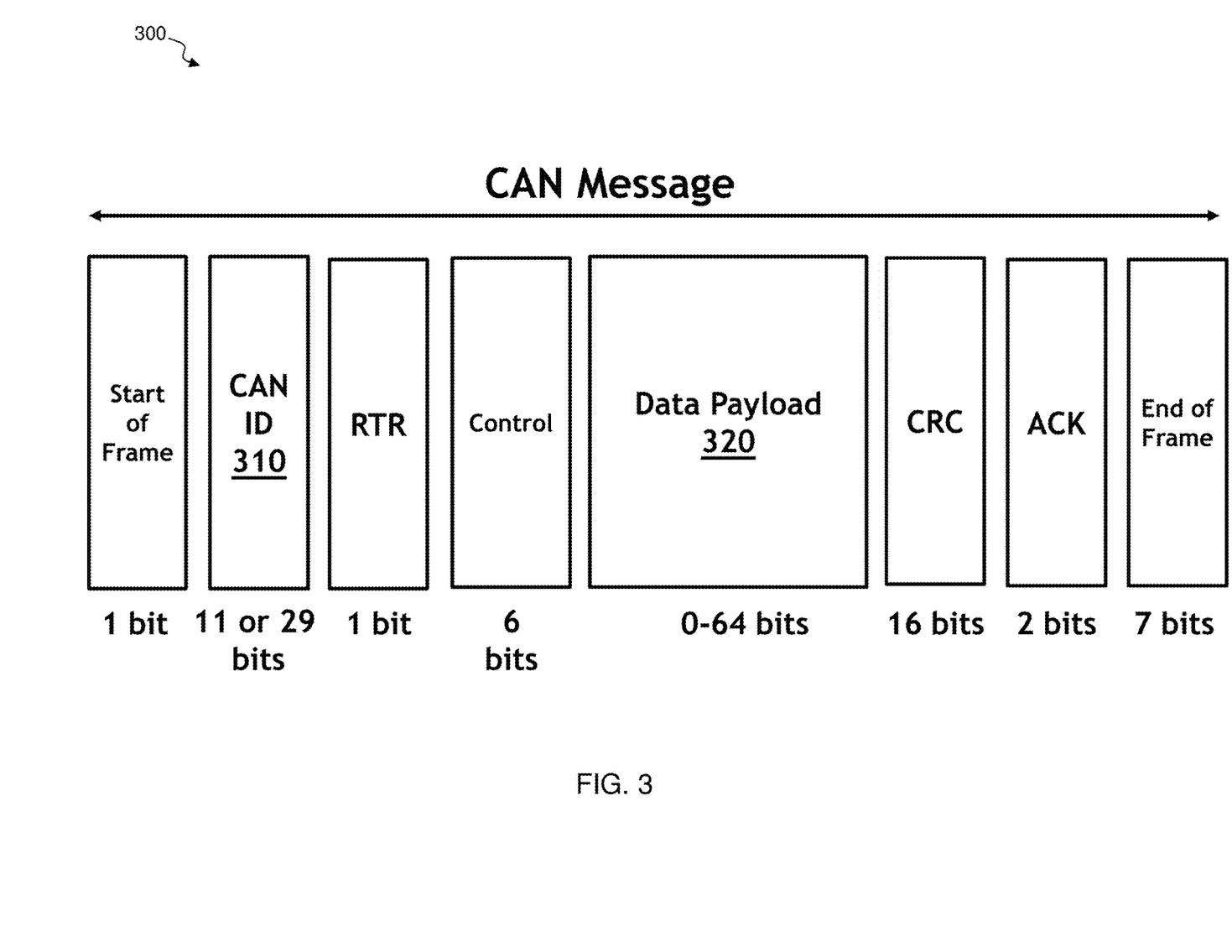
FIG. 3 illustrates a configuration of a CAN message such as received by the firewall of FIG. 2.

FIG. 3 illustrates a CAN message 300 that is a CAN frame having a typical format. Two defined portions of the CAN message 300 are specifically noted in FIG. 3, a message ID 310 and a data payload 320. The message ID 310 can be used for filtering and the payload 320 is a 64 bit data portion that can be used to determine anomalies. As noted herein, computational costs can be reduced by using less than all of the payload 320 to determine anomalies. The CAN message 300 can be communicated over a CAN bus as indicated in FIG. 2. In some examples, the CAN message 300 can be communicated over another data interface, such as an Ethernet cable, that is adapted to communicate CAN messages.

The anomaly detector 200 receives the CAN messages via a firewall 290. The firewall 290 can be part of a transceiver, such as transceiver 134 illustrated in FIG. 1. The firewall 290 receives messages via the CAN bus and filters the messages for delivery to the anomaly detector 200. The filtered set of messages provided to the anomaly detector 200 can be predetermined messages that are expected to be received by the computing platform/system associated with the anomaly detector 200. The firewall 290 can filter based on a message ID of the messages, such as message ID 310 in FIG. 3.

The anomaly detector 200 includes a first and second stage. The first stage is a contextual detector 210 that is configured to generate deviation values for monitored data types that are used to indicate contextual anomalies. The second stage is a collective detector 220 that is configured to determine collective anomalies from the deviation values by comparing the deviation values (e.g., all the deviation values), including the ones indicating contextual anomalies, to determine if a contextual anomaly is a malicious anomaly or a genuine anomaly representing an actual operating condition. Both the first and second stages include a least one neural network (NN).

The contextual detector 210 includes a content extractor 214 and neural networks (NNs) 218. The content extractor 214 is configurable to select which messages of the filtered set of messages to fetch for processing by the anomaly detector 200. The selected messages can be data types that have a continuous waveform. The selection can be based on the message IDs of the CAN messages. The content extractor 214 can then pre-filter the selected messages to eliminate noise, and as a result reduce computational cost.

Figure 4:
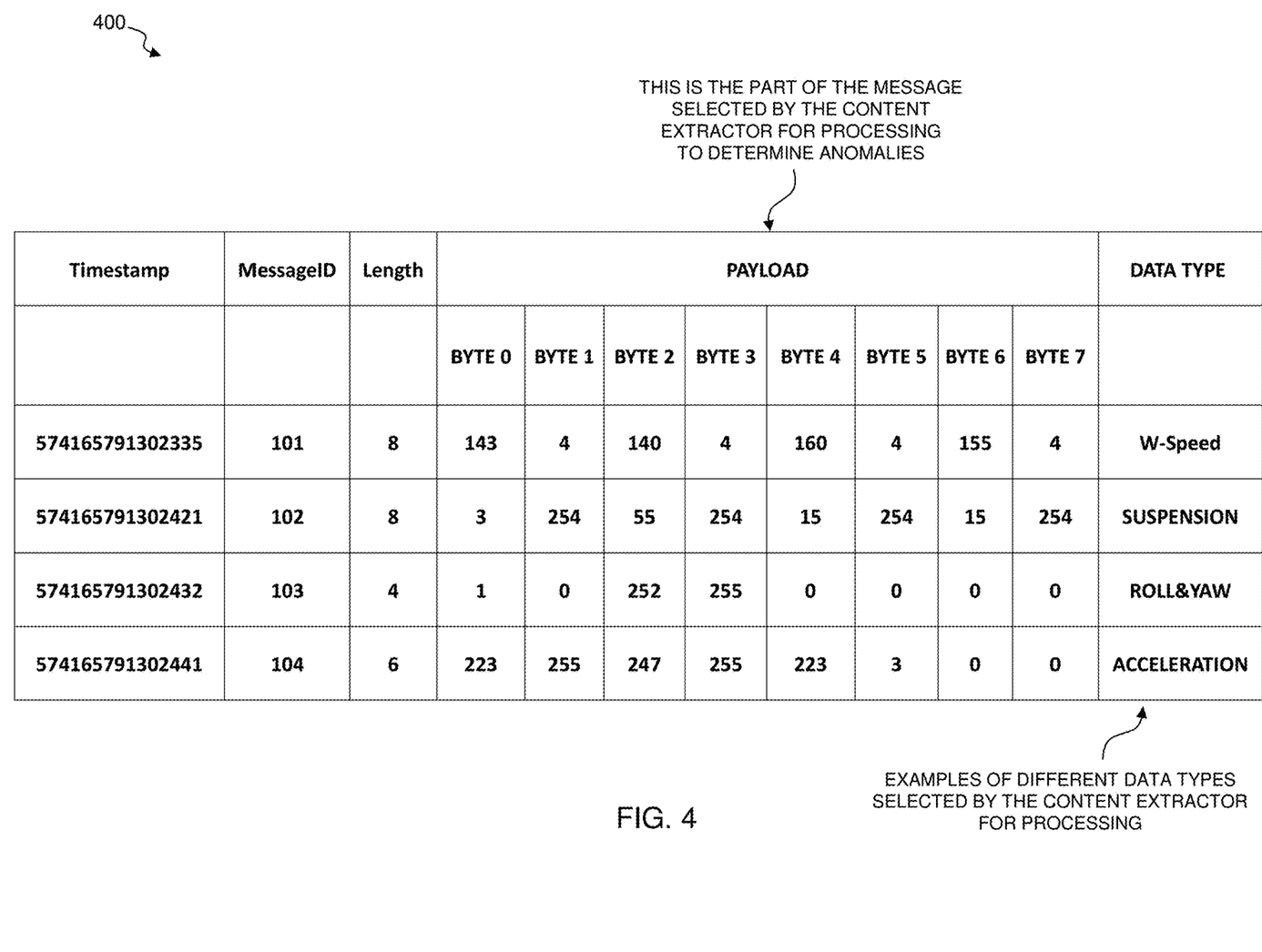
FIG. 4 illustrates a dataset of CAN messages selected by the content extractor of FIG. 2.

For example, the anomaly detector 200 can be configured to look at the specific signals of a vehicle represented in FIG. 4. Table 400 in FIG. 4 includes timestamp, message ID, length, and payload associated with four different data types: wheel speed, suspension, roll and yaw, and acceleration. The content selector 214 may receive, for example, fifteen messages through the firewall 290 and then pick these four signal-types, or data types, for specific analysis against anomalies. The type and number of messages selected for analysis is configurable and can be based on customer, use cases, etc. The performance of the anomaly detector 200 is not dependent on the number of or the type of messages selected for analysis. Using a vehicle as an example, the configuration of messages selected for analysis can depend on different vehicle manufacturers that have different dictionaries used to define message IDs. The firewall 290 and the content extractor can both be tailored for specific vehicle vendors.

In addition to selecting which messages to analyze, the content extractor 214 also performs selective extraction of the part of each message that includes the electrical signal, i.e., the payload of the message. The drawback of using the entire payload, such as all 64-bits of a payload, is that certain bytes of the payload may contain a counter, whereas others may represent a signal, such as speed. In a situation where the vehicle speed decreases, the counter value still increases, which can make the prediction of the contextual detector 210 unreliable. This solution eliminates this issue by using selected parts of the payload.

Additionally, by analyzing selected parts of the payload (using a content filtering mechanism) the solution provides adequate performance that allows deployment in real vehicle networks to catch anomalies and react in real time. Using the entire payload (e.g., 64 bits), can result in a computationally expensive solution since the unused bits create noise for neural networks and are likely to result in longer training cycles to be able to predict successfully.

Accordingly, the content extractor 214 can reduce processing power by ignoring parts of the payloads that are not relevant for the anomaly detection. The content extractor 214 provides the selected payload parts to the NNs 218. As indicated in FIG. 2, some of the payload parts can be anomalous.

The NNs 218 is part of the first stage of the anomaly detection process that predicts upcoming values of each monitored CAN signal. The NNs 218 include one NN for each signal that is being monitored. Using the monitored signals from Table 400 as an example, the NNs 218 would include one NN for each of the four signals being monitored: wheel speed, suspension, roll and yaw, and acceleration. The output of the NNs are a deviation value for at least some of the monitored CAN signals representing the probability of anomalies. A deviation value provided to the NN of the collective detector 220 in the second stage of the anomaly detector 200 can be the absolute value of the difference between the prediction and the real value divided by a mean error determined during training of a NN in the first stage of the anomaly detector, i.e., one of the NNs 218.

The deviation values are combined into a single stream and provided to the collective detector 220 for further processing. The collective detector 220 re-analyzes the deviation values by comparing a possible anomalous situation with respect to deviation values generated by other monitored signals. The collective detector 220 is a NN, such as the NNs 218 of the contextual detector 210. Each of the NNs of the anomaly detector 200 can be RNNs such as LSTMs.

The collective detector 220 provides an output, a probability of a malicious act or behavior (also referred to herein as a probability of an attack), that can be passed to a policy handler for processing. The policy handler can be, for example, a CAN Security Module of a VIDPS. The policy handler can direct or take various actions according to policies in response to the probability of the malicious act or behavior. The policies, for example, may require performing a safety measure such as logging the event in a security audit log, filtering out anomalous CAN messages from identified message IDs, or in other cases require a more drastic action of resetting a computing platform/system associated with the anomaly detector 200.

The anomaly detector 200 not only detects malicious acts or behavior reaching the host device that includes the anomaly detector 200, but in a case where the host device is compromised, the anomaly detector 200 can also potentially prevent an attack from reaching the data interface that carries the CAN messages. Hence in applications such as vehicles, accidents can be prevented or even hijacking of the vehicle.

Figure 5:
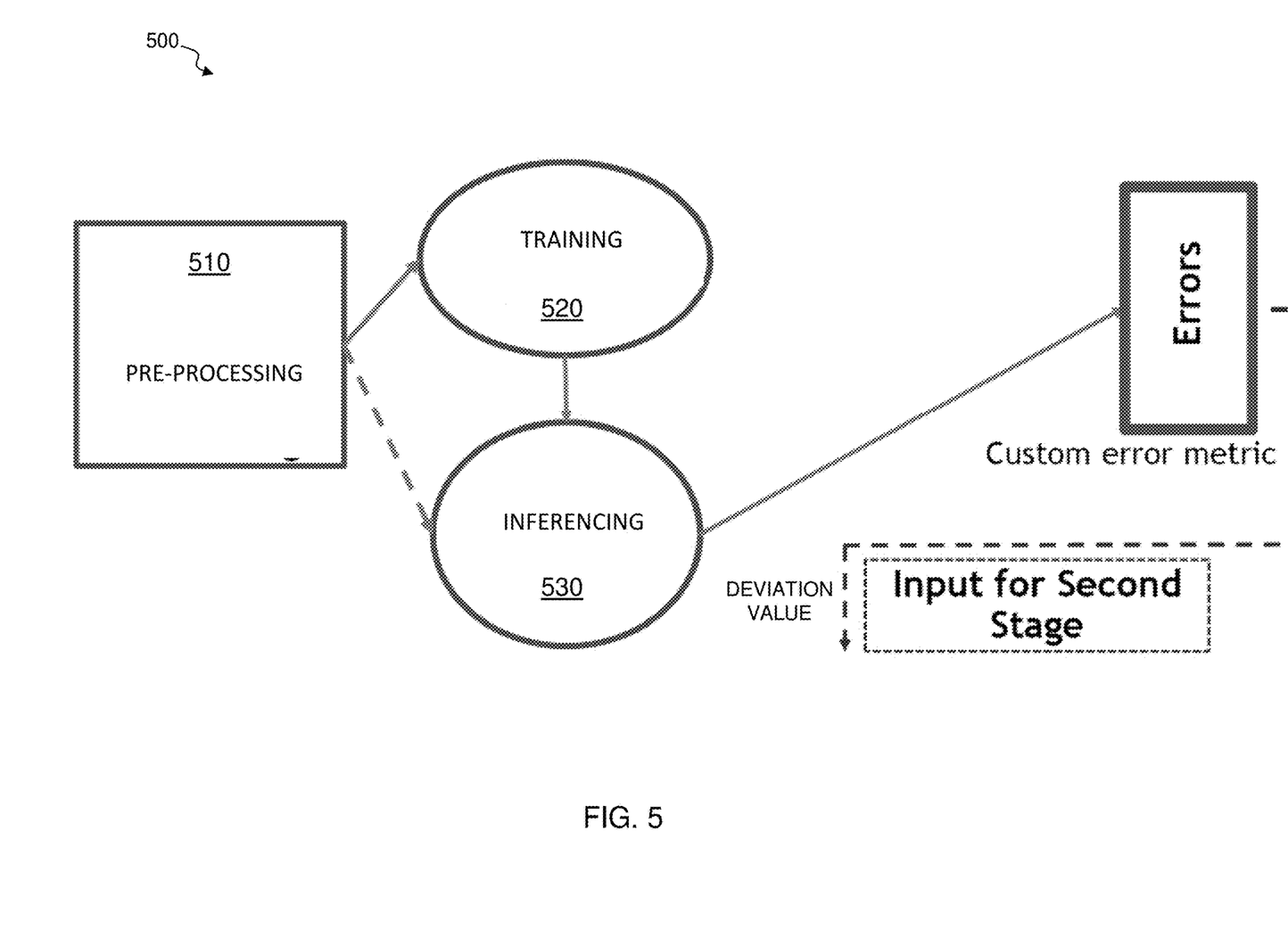
FIG. 5 illustrates a workflow of an example of the training and model that is used by the contextual detector of FIG. 2.
Figure 6:
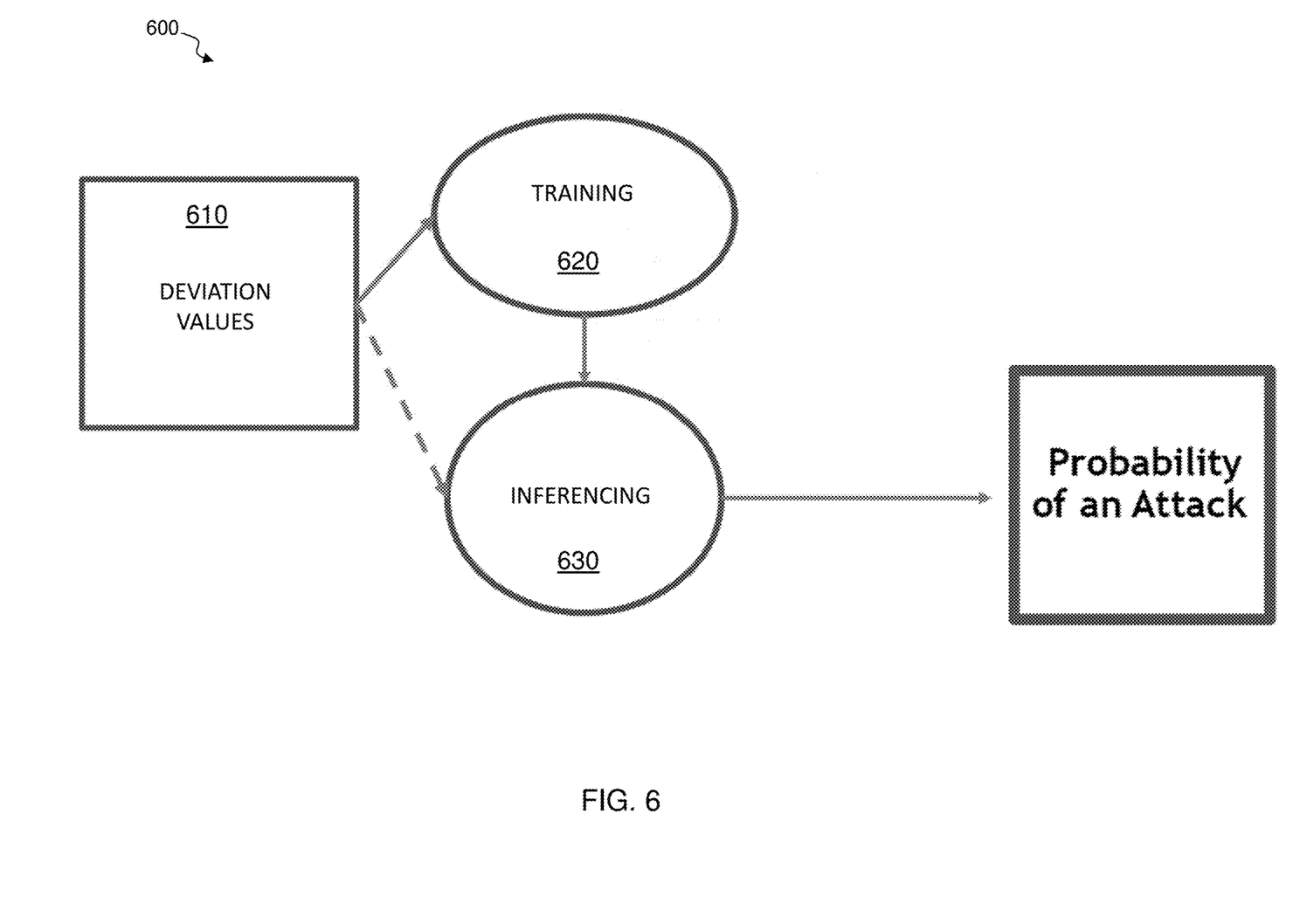
FIG. 6 illustrates a workflow of an example of the training and model that is used by the collective detector of FIG. 2.

The NNs of the anomaly detector 200 are trained to detect anomalous data—detect data that does not conform to learned models. The NNs can correspond to unsupervised learning algorithms that are trained with benign data, learn a model from the benign data, and infer a result by comparing the learned model to the inputs to detect non-compliance with the learned model The NNs can employ hyperparameters and generate learned models that are in a hierarchical data format (HDF). Considering NNs that are LSTMs, there are connections into and out of the LSTM gates with a few that are recurrent. The weights of these connections, which need to be learned during training, determine how the gates of the LSTM operate. The models can be adjusted based on such factors as different driving styles, different conditions, individual tendencies, etc. The training and resulting models are established and loaded on the NNs before operating of the anomaly detector 200. FIG. 5 illustrates a workflow of an example of the training and model that is used by the NNs 218 of the contextual detector 210. FIG. 6 illustrates a workflow of an example of the training and model that is used by the NN of the collective detector 220.

FIG. 5 illustrates a workflow of an example method 500 of training and developing models for contextual anomaly detection carried out according to the principles of the disclosure. The method 500 includes training and developing a model for a single data type that can then be used by a NN of a contextual detector, such as one of the NNs 218 of the contextual detector 210 of FIG. 2. The method 500 would be performed for each data type that is to be monitored. The method 500 includes pre-processing 510, training 520, and inferencing 530.

The pre-processing 510 and training 520 are typically performed on a computer that is separate from the computer or computing device that performs the actual contextual anomaly detection, such as the NNs 218. The pre-processing 510 includes preparing data of the data type for the training 520, which is performed by a NN. Accordingly, the pre-processing 510 includes obtaining the data needed for the training 520 and processing the data to put the data into a format for the NN. This typically includes ensuring that the training data is in the form of binary data for a NN. The training data can be CAN data and is typically normal data obtained under normal operating conditions. As such, the training 520 includes informing the NN how a system or device should operate normally and developing a model that reflects normal operation. The NN can employ unsupervised learning algorithms that are trained with the training data and learn a model from the training data. In inferencing 530, a result is inferred by comparing the learned model to actual inputs to detect non-compliance with the learned model. The inferencing 530 can employ the model to determine predicted data values from a received data package for a subsequent data package of the same data type. The inferencing 530 calculates errors for the various data types that are received and are unexpected, i.e., outside of range of predicted values based on the model. The calculated errors can then be normalized to create a deviation value for the data type that is provided as an input for determining collective anomalies.

For example, the training data can be CAN bus data corresponding to wheel speed recorded from a training vehicle while operating normally. The training data can be obtained from the training vehicle under different driving conditions to provide a mixed set of training data. The training 520 develops a model for normal operation of the wheel speed. The model is employed by a NN in a first stage of an anomaly detector, such as one of the NNs 218, to determine if an actual wheel speed signal received over a CAN bus is operating outside of the model, i.e., is it a contextual anomaly.

FIG. 6 illustrates a workflow of an example method 600 of training and developing models for collective anomaly detection carried out according to the principles of the disclosure. The method 600 includes training and developing a model that is used by a NN for detecting collective anomalies, such as the collective detector 220 of FIG. 2. The method includes receiving inputs 610, training 620, and inferencing 630.

Receiving inputs 610 includes receiving deviation values, such as a deviation value based on errors determined from the method 500. Multiple deviation values are received with each one corresponding to a different data type that is being monitored. Training 620 includes the NN developing a model that reflects deviation values from normal operation of the multiple monitored signals. The NN can employ unsupervised learning algorithms that are trained with data and learn a model from the data. In inferencing 630, a result is inferred by comparing the learned model to actual inputs to detect non-compliance with the learned model. Inferencing 630 can determine a probability of attack by employing the model and actual deviation values that are received. The probability of an attack is forwarded to a policy holder to determine an appropriate action to take.

Figure 7:
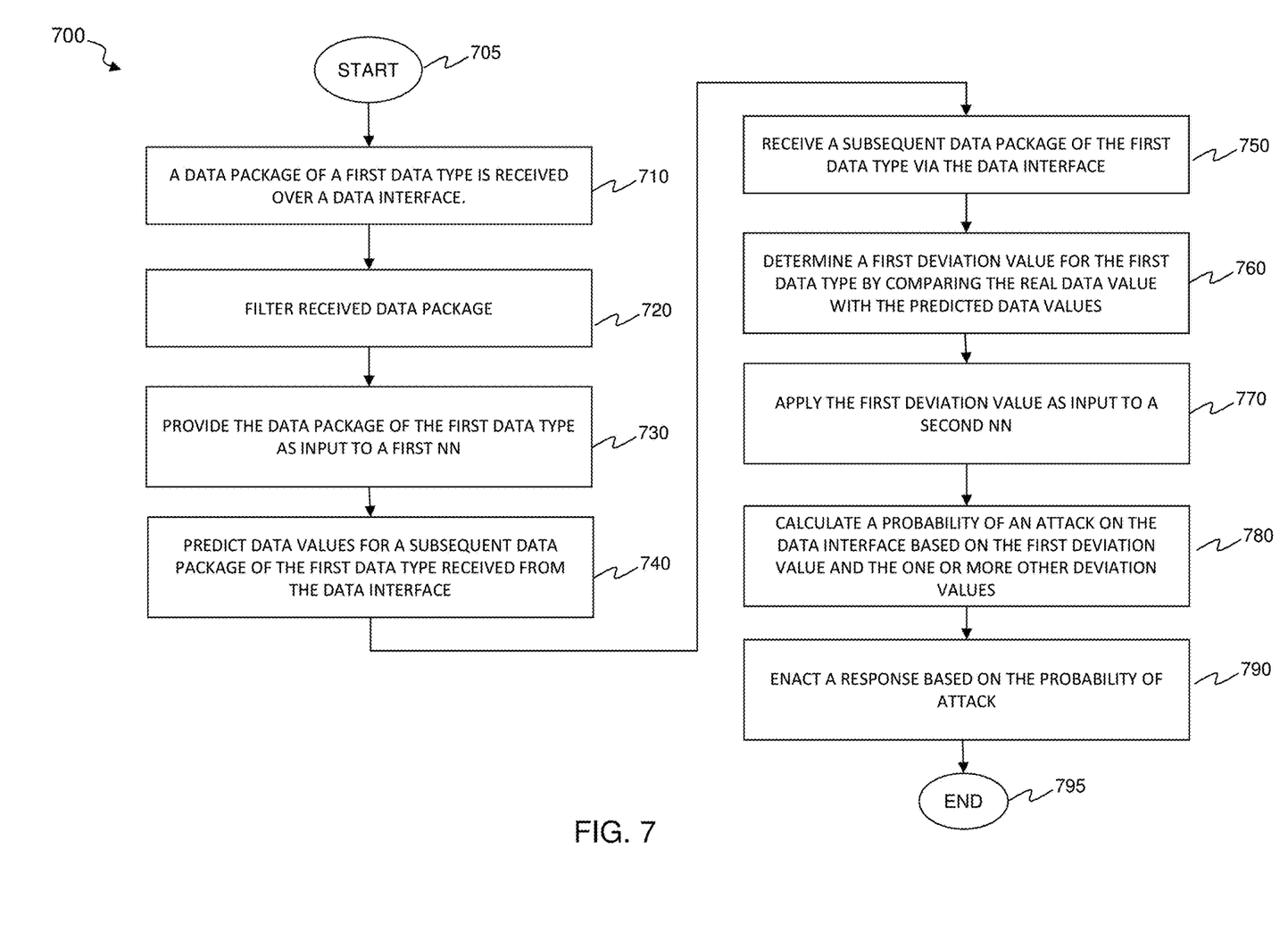
FIG. 7 illustrates a flow diagram of an example of a method for detecting anomalous data communicated over a data interface.

FIG. 7 illustrates a flow diagram of an example of a method 700 for detecting anomalous data communicated over a data interface. The method 700 can be carried out by an anomalous detector that includes a first NN stage and a second NN stage, such as the anomalous detector 200 disclosed herein. The method 700 begins in a step 705.

In a step 710, a data package of a first data type is received over a data interface. The data package can be a CAN message and the data interface a CAN bus. The first data type is a data type that has been designated for monitoring. For example, the data package can be the data signal for wheel speed.

The received data package is filtered in a step 720 before further processing. The filtering, or pre-filtering, can result in a reduction of computational cost by, for example, removing noise from the data package. A content extractor, such as content extractor 214 of FIG. 2, can perform the filtering.

In a step 730, the data package of the first data type is provided as input to a first NN. The first NN can be a RNN such as an LSTM. Based on the first data package, the first NN predicts data values for a subsequent data package of the first data type received from the data interface in step 740. The predicted data values can be based on a model developed during training for the first NN and the first data type.

In a step 750, a subsequent data package of the first data type is received via the data interface. The subsequent data package includes a real data value of the data type. For example, the real data value can be a wheel speed of an operating vehicle that is obtained at a later time than a wheel speed of the first data package.

In a step 760, a first deviation value for the first data type is determined by comparing the real data value with the predicted data values. In one example, the first deviation value is determined by calculating the absolute value of the difference between the real data values and the predicted data values, divided by a mean error determined during training of the first neural network.

The first deviation value is applied in a step 770 as input to a second NN. One or more other deviation values corresponding to one or more other data types are also applied as input to the second NN. The one or more other deviation values can be determined according to steps 710 through 760.

In a step 780, the second NN calculates a probability of an attack on the data interface based on the first deviation value and the one or more other deviation values. A response is then enacted in a step 790 based on the probability of attack. The response can be according to policies established for a system associated with the data interface. A policy holder may include configurable logging and/or prevention policy actions according to different probability of attacks. The response can be performing a safety measure. In one example, enacting a response includes determining a message ID of a data package with a calculated probability of an attack above a threshold and filtering data packages corresponding to the message ID. Other responses can also be enacted based on the probability of attack. The method 700 ends in a step 795.

The disclosure provides detection of anomalies in communicated data by advantageously employing two NN stages to find unusual patterns in data that do not conform to expected behavior. The first NN stage determines contextual anomalies and then the second NN stage determines collective anomalies. Using a vehicle as an example, consider a scenario where there is an accident. Data collected from the vehicle is analyzed to determine potential genuine anomalies before being able to differentiate a malicious anomaly from a genuine anomaly.

Essentially what is being done in the first stage of the anomalous detection disclosed herein is looking at the waveforms of each input received by the anomaly detector, such as how the speed changes, how the acceleration changes, and how the speeding angles change. A prediction is then done on what to expect next.

These predictions are all concatenated in the second stage where the examined waveforms have all evolved in time. The second stage is performed because if a vehicle is in extreme conditions or a condition of driving is extreme, false alarms can be prevented. Assume that the driver is avoiding an accident and there is an increase in speed, a sudden spike in one direction that is sudden braking, and then there is a sudden acceleration. All of these combined signals would represent a combination of high deviations from the machine learned predictions that can be used to avoid raising an anomaly alarm by letting the combined spike go through the system as a genuine anomaly. A real life anomaly as opposed to a malicious anomaly where someone has taken control of the car. The second stage, however, does not jeopardize detecting contextual anomalies because these are detected by the first stage.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

The above-described apparatuses, systems or methods or at least a portion thereof may be embodied in or performed by various processors, such as digital data processors or computers including GPUs, wherein the processors are programmed or store executable programs or sequences of software instructions to perform one or more of the steps of the methods or functions of the apparatuses or systems. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system described herein.

Certain embodiments disclosed herein or features thereof may further relate to computer storage products with a non-transitory computer-readable medium that has program code thereon for performing various computer-implemented operations that embody at least part of the apparatuses, the systems, or to carry out or direct at least some of the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

What is claimed is:

1. A method for detecting anomalous data communicated over a data interface, the method comprising:
    applying a first data package of a first data type received from a data interface as input to a first neural network;
    generating, by the first neural network and based on the first data package, predicted data values for a subsequent data package of the first data type received from the data interface;
    receiving, over the data interface, a subsequent data package of the first data type comprising real data values;
    determining, based on a difference between the predicted data values and the real data values, a first deviation value for the first data type by comparing the real data values with the predicted data values;
    applying the first deviation value with other deviation values corresponding to other data types as input to a second neural network; and
    calculating, by the second neural network, a probability of an attack on the data interface by comparing the first deviation value to the other deviation values.

2. The method of claim 1, wherein at least one of the first neural network or the second neural network comprises a recurrent neural network (RNN).

3. The method of claim 2, wherein the RNN comprises a long-short term memory (LSTM).

4. The method of claim 1, wherein the other deviation values include at least one deviation value that indicates a contextual anomaly.

5. The method of claim 1, wherein determining the first deviation value comprises calculating an absolute value of the difference between the real data values and the predicted data values, divided by a mean error determined during training of the first neural network.

6. The method of claim 1, further comprising:
    determining a message ID corresponding to a data package with a calculated probability of an attack above a threshold; and
    performing a safety measure based on the calculated probability being above the threshold.

7. The method of claim 6, wherein performing the safety measure comprises performing at least one of:
    filtering data packages corresponding to the message ID;
    logging a receipt of the first data package as an event in a security audit log; or
    resetting a computing system comprising the data interface.

8. The method of claim 7, wherein the data interface comprises a Controller Area Network (CAN) bus.

9. An electronic system, comprising:
    a broadcast bus;
    peripheral devices coupled to the broadcast bus; and
    a computer coupled to the broadcast bus and including an anomaly detector having one or more processors to perform operations including;
        determining contextual anomalies for different data types communicated over the broadcast bus from the peripheral devices employing parallel neural networks, wherein each of the contextual anomalies are based on a deviation value that corresponds to a difference between a predicted data value of the different data types and a real data value of the different data types communicated over the broadcast bus, wherein the contextual anomalies represent a probability of an anomaly in the different data types and each one of the parallel neural networks is for one of the different data types; and
        determining collective anomalies for indicating which of the contextual anomalies are out of context by employing a second neural network to compare each of the deviation values with one or more of the other deviation values, and generating a probability of an attack on a data interface based on the contextual anomalies that are out of context.

10. The system as recited in claim 9 wherein the probability of attack indicates a probability of an error in subsequent communications of the different data types associated with the contextual anomalies that are out of context.

11. The system as recited in claim 10 wherein the one or more operations further include selecting the different data types from data packages received via the data interface and selecting a payload from the different data types for further processing.

12. The system as recited in claim 9 wherein the neural network is a recurrent neural network.

13. The system as recited in claim 9 wherein the neural networks are cascaded LSTMs.

14. The system as recited in claim 13 wherein the neural networks operate in parallel and independently with respect to each other.

15. The system as recited in claim 9 wherein the different data types include a continuous waveform.

16. The anomaly detector as recited in claim 9 wherein the data interface is a Controller Area Network (CAN) bus.

17. The anomaly detector as recited in claim 9 wherein the determining the contextual anomalies that are out of context is performed in real time.

18. A method of detecting anomalies of data communicated via a data interface, comprising:
    determining contextual anomalies for different data types communicated over a data interface by generating deviation values for the different data types employing a first neural network, wherein the deviation values are based on a difference between a predicted data value of the different data types and a real data value of the different data types communicated over the data interface;

determining which of the contextual anomalies are out of context by comparing each of the deviation values to one or more of the other deviation values employing a second neural network; and generating a probability of attack based on the contextual anomalies that are out of context, wherein the probability of attack indicates a probability of an error in subsequent communications of the different data types associated with the contextual anomalies that are out of context.

19. The method as recited in claim 18 further comprising selecting the different data types from data packages received via the data interface and selecting a payload from the different data types for further processing to determine the contextual anomalies.

20. The method as recited in claim 18 wherein each of the different data types includes a continuous waveform.

* * * * *